United States Patent [19]

Oda et al.

[11] Patent Number: 4,854,025
[45] Date of Patent: Aug. 8, 1989

[54] METHOD OF PRODUCING A TURBINE ROTOR

[75] Inventors: Isao Oda, Nagoya; Nobuo Tsuno, Kasugai, both of Japan

[73] Assignee: NGK Insulators, Ltd., Nagoya, Japan

[21] Appl. No.: 192,366

[22] Filed: May 10, 1988

Related U.S. Application Data

[62] Division of Ser. No. 867,538, May 28, 1986, Pat. No. 4,761,117.

[30] Foreign Application Priority Data

Jun. 12, 1985 [JP] Japan ................... 60-126293

[51] Int. Cl.$^4$ ................. B21K 3/00; B23P 15/00
[52] U.S. Cl. .................. 29/156.8 R; 29/447; 29/527.1; 416/241 B
[58] Field of Search ............ 29/156.8 R, 446, 447, 29/527.1; 148/144; 416/241 B, 241 R, 244 A, 213 R; 228/122, 124, 135, 231; 417/407; 415/212, 214

[56] References Cited

U.S. PATENT DOCUMENTS

| | | | |
|---|---|---|---|
| 3,108,913 | 10/1963 | Sommer | 148/39 |
| 3,604,819 | 9/1971 | Krahe et al. | 416/204 |
| 3,801,226 | 4/1974 | Bevan et al. | 416/241 |
| 4,063,850 | 12/1977 | Hueber et al. | 29/156.8 R |
| 4,123,199 | 10/1978 | Shimizu et al. | 416/244 A |
| 4,256,441 | 3/1981 | Arora | 417/407 |
| 4,424,003 | 1/1984 | Brobeck | 416/241 B |
| 4,479,293 | 10/1984 | Miller et al. | 29/156.8 R |
| 4,479,735 | 10/1984 | Thompson et al. | 403/28 |
| 4,486,147 | 12/1984 | Byrne et al. | 416/213 R |
| 4,557,704 | 12/1985 | Ito et al. | 464/181 |
| 4,585,396 | 4/1986 | Kawamura et al. | 416/241 B |
| 4,614,453 | 9/1986 | Tsuno et al. | 403/30 |
| 4,697,325 | 10/1987 | Kanigaito et al. | 29/156.8 R |

FOREIGN PATENT DOCUMENTS

| | | |
|---|---|---|
| 2734747 | 2/1979 | Fed. Rep. of Germany . |
| 3343203 | 11/1982 | Fed. Rep. of Germany . |
| 59103902 | 6/1982 | Japan . |

Primary Examiner—Howard N. Goldberg
Assistant Examiner—Irene Cuda
Attorney, Agent, or Firm—Arnold, White & Durkee

[57] ABSTRACT

A method of producing turbine rotor having a including vane wheel made of ceramics, a ceramic shaft formed integrally with the turbine wheel, and a metallic shaft bonded to the ceramic shaft. The hardness of a part of or the whole part of a compressor wheel-fitting shaft portion of the metallic shaft is made smaller than that of a portion of metallic shaft apart from the compressor wheel-fitting shaft, said portion being located on the turbine vane wheel side. Thereby, slackening between the compressor wheel and the fitting shaft is avoided.

11 Claims, 4 Drawing Sheets

FIG_1
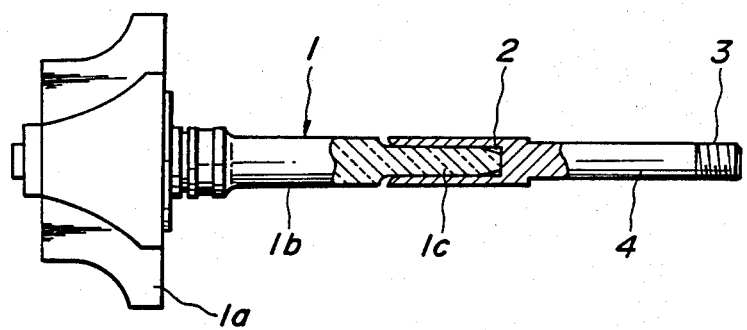
FIG_2
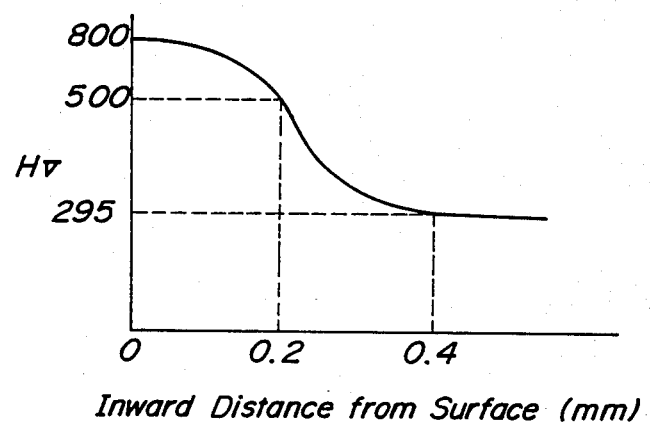
Inward Distance from Surface (mm)

Inward Distance from Surface (mm)

METHOD OF PRODUCING A TURBINE ROTOR

This is a division of application Ser. No. 867,538 filed May 28, 1986, now U.S. Pat. No. 4,761,117.

BACKGROUND OF THE INVENTION

1. Field of the Invention

The present invention relates to a method of producing a ceramic-metal composite body, and more specifically, a turbine rotor.

2. Related Art Statement

Since ceramics such as zirconia, silicon nitride and silicon carbide are excellent in mechanical strength, heat resistance and wear resistance, they have attracted attention as high temperature structural materials and wear resistive materials for gas turbine engine parts, engine parts and so on. However, the ceramics are inferior to the metallic materials in terms of shape formability because they are hard and brittle. Further, ceramics have weak resistance against impact forces due to their poor toughness. For this reason, it is difficult to form mechanical parts such as the engine parts only from the ceramic materials, and they are generally used in a composite structural body in which a metallic member is bonded to a ceramic member.

Heretofore, turbine rotors have been known as metal-ceramic composite bodies of this kind. FIG. 6 is a partial sectional view showing an example of such a turbine rotor. In FIG. 6, the turbine rotor is integrally formed by fitting a ceramic shaft 52 integrally formed with a turbine vane wheel 51 made of ceramics into a depression 54 of a metallic member 53. The fitting is ordinarily carried out through press fitting, shrink fitting, or expansion fitting. A fitting shaft 55 for mounting a compressor wheel not shown is provided on an opposite side to the turbine vane wheel side of the metallic member 53.

Problems to be solved by the Present Invention

The above-mentioned turbine rotor has been heretofore used in the state that the whole metallic member 53 had the same high hardness or only a part of the outer periphery of the depression-provided portion which was to be brought into contact with a bearing was further hardened. Therefore, the shaft 55 for fitting a compressor wheel had a high hardness.

In actual use, when a compressor wheel 57 fitted to the compressor wheel-fitting shaft portion 55 by means of a thrust bearing 58 and a tightening nut 56 as shown in FIG. 7 is rotated at a high speed, the compressor wheel 57 is elongated in an arrow direction in this figure, that is, outwardly in a radial direction. Consequently, a distance L of the compressor wheel 57 in this figure shortens. Thus, it has been necessary that the fitting shaft 55 was elastically elongated by means of the tightening nut 56 by a shortened amount of the distance L when the compressor wheel 57 was assembled. However, when the hardness of the compressor wheel-fitting shaft 55 is high as in the conventional case, the fitting shaft 55 cannot allow a necessary amount of the elastic deformation. Thus, there exists a defect that the shrink amount cannot be absorbed, and the compressor wheel 57 slackens during use.

SUMMARY OF THE INVENTION

It is an object of the present invention to obviate the above-mentioned problem, and to provide a method for producing a turbine rotor which can always afford stable performances while a compressor wheel and a fitting shaft thereof do not slacken even under rotation at high speeds.

The turbine rotor produced according to the method of the present invention is constituted by a turbine vane wheel made of ceramics, a ceramic shaft integrally formed with the vane wheel, and a metallic shaft bonded to the ceramic shaft. The hardness of a part of or the whole part of the compressor wheel-fitting shaft portion of the metallic shaft is smaller than that of a part of the metallic shaft at a location near the turbine vane wheel side apart from the compressor wheel-fitting shaft portion.

The turbine rotor-producing method according to the present invention is directed to a method of producing a turbine rotor constituted by the ceramic turbine vane wheel, a ceramic shaft integrally formed with the vane wheel and a metallic shaft bonded to the ceramic shaft, and is characterized by subjecting a portion of the metallic shaft located on the turbine vane wheel side apart from the compressor wheel-fitting shaft portion to a hardening treatment such as high frequency induction hardening or ion nitriding before or after the metallic shaft is bonded to the ceramic shaft, thereby rendering the hardness of said portion larger than that of the compressor wheel-fitting shaft portion.

Another turbine rotor-producing method according to the present invention is directed to a method of producing a turbine rotor constituted by a ceramic turbine vane wheel, a ceramic shaft integrally formed with the vane wheel and a metallic shaft bonded to the ceramic shaft, and is characterized in that a part of or the whole part of the metallic shaft is constituted by a precipitation hardenable type alloy, the part of the metallic shaft constituted by the precipitation hardenable allow is hardened through precipitation hardening treatment after the metallic shaft is bonded to the ceramic shaft, and then a part of or the whole part of the compressor wheel-fitting shaft portion of the metallic shaft is softened under reheating to a solution treatment temperature to make the hardness of a part of or the whole part of the compressor wheel-fitting shaft portion smaller than that of a portion of the metallic shaft located on the turbine vane wheel side apart from said part of the compressor wheel-fitting shaft portion.

According to the present invention, since the hardness of a part of or whole part of the compressor wheel-fitting shaft portion of the metallic shaft is made smaller than that of a portion of the metallic shaft located on the turbine vane wheel side, the fitting shaft can be elastically deformed by means of a tightening nut by a shrink amount of the compressor wheel to be caused under rotation at high speeds, when the compressor wheel is attached to the metallic shaft.

In order to constitute the turbine rotor in such a manner, according to the method of the present invention, the metallic member is adjusted to a given hardness, and then before or after the ceramic member and the metallic member are bonded together, a portion of the metallic member on the turbine vane wheel side is hardened by means of the high frequency induction hardening or the like, or alternatively the whole portion of the metallic member is hardened through aging and subsequently a part of or the whole part of the compressor wheel-fitting shaft portion is softened through solution treatment.

The hardness of the compressor wheel-fitting shaft portion is properly in a range of from Hv 250 to Hv 400 in Vicker's hardness. If the hardness is smaller than Hv 250, sufficient strength of the fitting shaft cannot be obtained, while if it is larger than Hv 400, the elastic deformation required in the present invention cannot be acquired.

These and other objects, features, and advantages of the present invention will be well appreciated upon reading of the following description of the invention when taken in conjunction with the attached drawings, understanding that some modifications, variations and changes could be made by the skilled in the art to which the invention pertains without departing from the spirit of the invention or the scope of the claims appended hereto.

BRIEF DESCRIPTION OF THE DRAWINGS

For better understanding of the invention, reference is made to the attached drawings, wherein:

FIG. 1 is a partial sectional view showing an embodiment of the turbine rotor according to the present invention;

FIG. 2 is a diagram showing a hardness distribution in a radial direction of the embodiment shown in FIG. 1;

DETAILED DESCRIPTION OF THE INVENTION

Figure 3:
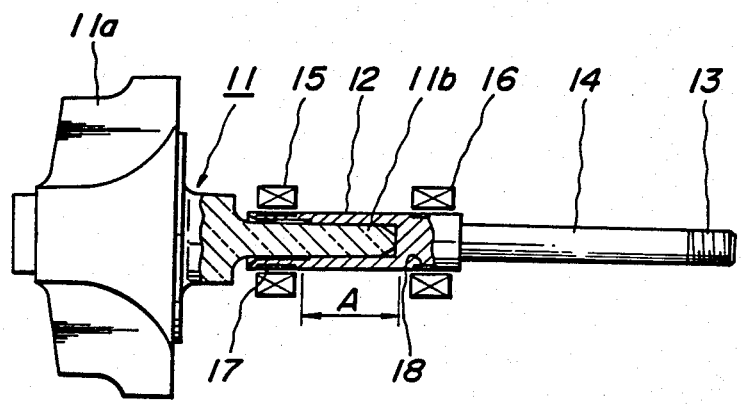
FIG. 3 is a partial sectional view showing another embodiment according to the present invention.

Preferred embodiments according to the present invention will be explained in more detail with reference to the attached drawings.

EXAMPLE 1

FIG. 1 is a partial sectional view showing an embodiment of the turbine rotor according to the present invention.

First, a ceramic member 1 was made from silicon nitride produced according to a pressureless sintering method. This ceramic member 1 had a vane wheel 1a having a diameter of 60 mm, a shaft portion 1b having a diameter of 10 mm and a projection 1c at its tip end. A round bar of chromium molybdenum steel (JIS SCM 435) was prepared. This bar had undergone oil quenching after having been entirely held at 850° C. for one hour, and then tempered by reheating at 635° C. for one hour.

The round bar was then machined to form a compressor wheel-fitting shaft 4 having a depression-provided portion 2 of an outer diameter of 10 mm at one end and a threaded portion 3 at the other end. This threaded portion had an outer diameter smaller than that of the depression-provided portion. A projection 1c of the ceramic member 1 was press fitted into the depression of the compressor wheel-fitting shaft 4 at 350° C. to obtain a turbine rotor shown in FIG. 1. At that time, the hardness of the fitting shaft 4 was Hv 295.

The outer periphery of the depression-provided portion 2 of the fitting shaft 4 was then subjected to the surface hardening treatment of ion nitriding. This nitriding treatment was carried out in a mixed gas of $H_2:N_2=3:7$ at 530° C. for 10 hours. As shown in FIG. 2, the hardness of the depression portion 2 after the nitriding treatment was Hv 800 at the surface and decreased toward the inner side therefrom. Thereafter, the turbine rotor was finished to obtain the turbine rotor having a final profile shown in FIG. 1.

After a compressor wheel was mounted onto the thus obtained turbine rotor under consideration upon a shrink amount, a rotary test was carried out at a speed of revolution of 150,000 rpm in a combustion gas for 100 hours by using a hot spin tester. As a result, no slackening was observed in the compressor wheel.

EXAMPLE 2

FIG. 3 is a partial sectional view showing another embodiment of the turbine rotor according to the present invention. A ceramic member 11 was prepared from silicon nitride obtained by a pressureless sintering method. This ceramic member 11 had a vane wheel 11a of a diameter of 60 mm and a projection 11b of a diameter of 8 mm. A round bar of a diameter of 10 mm was prepared from nitriding steel (JIS SACM 645). The whole nitriding steel had been held at 900° C. for one hour, quenched in water and tempered. The hardness of this nitriding steel was Hv 293.

Figure 4:
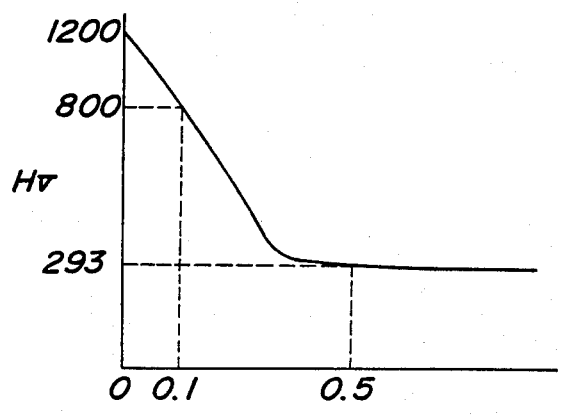
FIG. 4 is a diagram showing a hardness distribution in a radial direction of the embodiment shown in FIG. 3.

Next, after only the outer periphery of the round bar was worked in a profile substantially equal to that of a metallic shaft shown in FIG. 3, portions 17 and 18 of the round bar which were to be contacted with bearing 15 and 16 were subjected to the surface hardening treatment of ion nitriding. This nitriding treatment was carried out by maintaining the round bar at 550° C. in a mixed gas of $H_2:N_2:1:1$ for 20 hours after the portion other than the bearing-contacting portions 17 and 18 was covered with a mild steel cover. As shown in FIG. 4, the hardness of the hardened portions 17 and 18 after the nitriding treatment was Hv 1,200 at the surface and decreased toward the inner side therefrom.

Consequently, the compressor wheel-fitting shaft 14 which had a depression-provided portion 12 with the above-mentioned hardened portions 17 and 18 at one end of the nitriding-treated round bar and a threaded portion 13 smaller in outer diameter than that of the depression portion at the other end was obtained. The inner diameter of the depression was 7.9 mm at a portion "A" located between the hardened portions and 8.1 mm at the other portion. The projection 11b of the ceramic member 11 was press fitted into the depression 12 of the compressor wheel-fitting shaft 14 at 350° C. to obtain a turbine rotor shown in FIG. 3. At that time, the portion of the compressor wheel-fitting shaft other than the nitriding treatment hardened portions 17 and 18 had a hardness of Hv 293. Then, the turbine rotor having a final profile was obtained by final finishing.

After the compressor wheel was fitted to this turbine rotor under consideration upon a shrink amount, a rotary test was carried out at a speed of revolution of 150,000 rpm in a combustion gas for 100 hours by using a hot spin tester. As a result, no slackening was observed in the compressor wheel.

EXAMPLE 3

Figure 5:
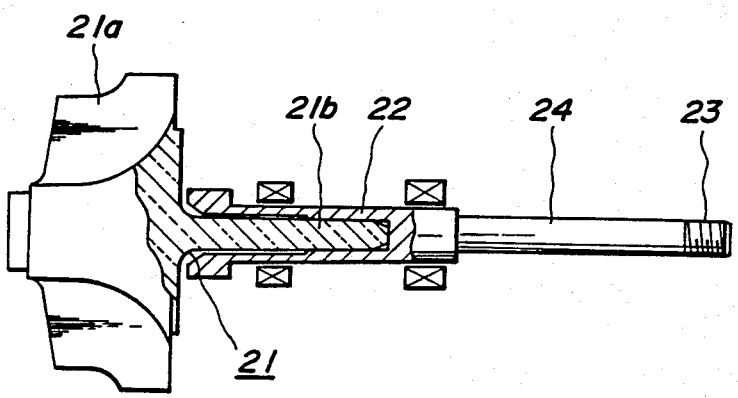
FIG. 5 is a partial sectional view showing a still another embodiment according to the present invention.
Figure 6:
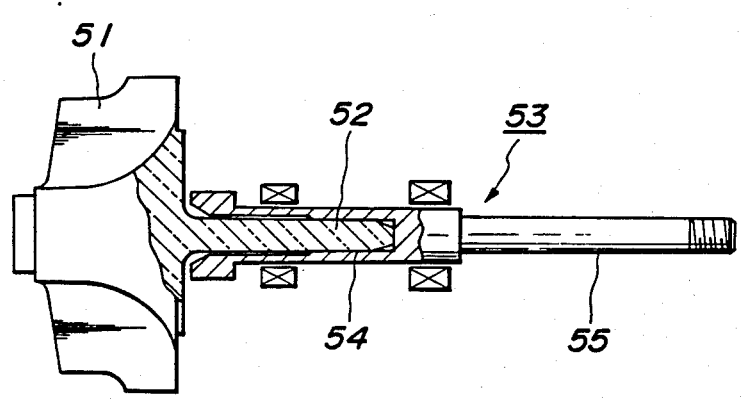
FIG. 6 is a partial sectional view of a conventional turbine rotor.
Figure 7:
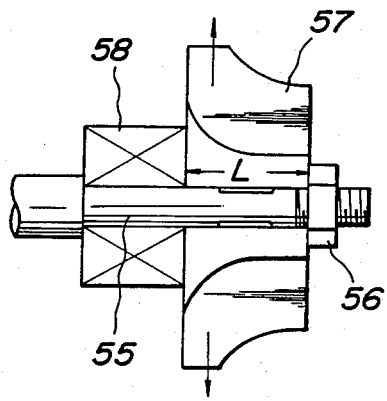
FIG. 7 is a schematic diagram showing a state in which a compressor wheel is fitted to a fitting shaft.

FIG. 5 is a partial sectional view showing still another embodiment of the turbine rotor according to the present invention. First, a ceramic member 21 was prepared from silicon nitride obtained by the pressureless sintering method. This ceramic member 21 had a vane wheel 21a of 60 mm in a diameter and a projection 21b of 7.8 mm in diameter. Then, a round bar of solution-treated maraging steel was worked to obtain a metallic member. This metallic member had a depression-provided portion 22 having a depression of an outer diameter of 9.5 mm and an inner diameter of 8.0 mm at from an open end to a depth of 30 mm and an inner diameter of 7.72 mm at a depth from 30 mm to 45 mm at one end and a threaded portion 23 and a compressor fitting portion 24 smaller in outer diameter than that of the depression-provided portion. Thereafter, the projection 21b of the ceramic member 21 was press fitted into the depression of the metallic member at room temperature to obtain a turbine rotor shown in FIG. 5. At that time, the hardness of metallic portion was HRC 33 in Rockwell Hardness.

Next, the whole turbine rotor was age hardened by heating it at 550° C. for 3 hours. The hardness of the age hardened metallic member was HRC 52. Then, only the compressor fitting portion 24 was reheated at 830° C. for 15 minutes to effect solution treatment. The hardness of the solution-treated fitting portion 24 was HRC 32. Thereafter, the final finishing was carried out to obtain a turbine rotor having a final profile shown in FIG. 5.

A compressor wheel was mounted onto this turbine rotor under consideration upon a shrink amount. Then, a rotary test was carried out at a speed of revolution of 150,000 rpm for 100 hours in a combustion gas by using a hot spin tester. As a result, no slackening was observed in the compressor wheel.

The present invention is not restricted to the above-mentioned embodiments only, and many modifications and changes are possible. For instance, although silicon nitride was used as the ceramic members in the above-mentioned embodiments, silicon carbide, sialon, etc. may be used depending upon use purpose. In addition, as the metallic materials, nickel chromium molybdenum steel, precipitation hardenable type stainless steel, precipitation hardenable type super alloy, etc. may be used besides nitriding steel, chromium molybdenum steel, and maraging steel. Although the ceramic member was bonded to the metallic shaft through press fitting in the above-mentioned embodiments, bonding may be carried out by other method such as brazing.

EFFECTS OF THE INVENTION

As obvious from the foregoing explanation, according to the turbine rotor and its producing method of the present invention, the hardness of a part or the whole part of the compressor wheel-fitting shaft of the metallic shaft is designed lower as compared with a portion located on the turbine vane wheel side. Thus, the fitting shaft can be elastically elongated by the tightening nut by a shrink amount of the compressor wheel to be caused during a high speed rotation, when the compressor wheel is assembled, so that no slackening is produced between the compressor wheel and the fitting shaft thereof even at a high speed rotation. Accordingly, the turbine rotor which can always exhibit stable performances can be obtained.

What is claimed is:

1. A method of producing a turbine rotor comprising a turbine vane wheel made of ceramics, a ceramic shaft formed integrally with the vane wheel and a metallic shaft bonded to the ceramic shaft, said method comprising making a part of or the whole part of the metallic shaft from a precipitation hardenable type alloy, bonding the metallic shaft to the ceramic shaft, hardening the part of the metallic shaft made of the precipitation hardenable type alloy through precipitation hardening treatment, softening the part of or the whole part of the compressor wheel-fitting shaft portion of the metallic shaft through heating again at a solution treating temperature, wherein the hardness of a part of or the whole part of the compressor wheel-fitting shaft portion is made smaller than that of the metallic shaft located on the turbine vane wheel side apart from said part of the compressor wheel-fitting shaft portion.

2. A method of producing a turbine rotor according to claim 1, wherein the bonding between the metallic shaft and the ceramic shaft is made through interference fitting between a depression formed in the metallic shaft and a projection formed in the ceramic shaft.

3. A method of producing a turbine rotor according to claim 1, wherein the bonding between the metallic shaft and the ceramic shaft is made through fitting a projection formed in the ceramic shaft and having a diameter larger than the inner diameter of a depression formed in the metallic shaft by from 0.1% to 10% of the latter into the depression.

4. A method of producing turbine rotor according to claim 1, wherein the bonding between the metallic shaft and the ceramic shaft is carried out through brazing.

5. A method of producing a turbine rotor comprising a turbine vane wheel made of ceramics, a ceramic shaft formed integrally with the vane wheel and a metallic shaft bonded to the ceramic shaft, said method comprising bonding the metallic shaft to the ceramic shaft, subjecting a portion of the metallic shaft located on a turbine wheel side apart from a compressor wheel-fitting shaft portion to a hardening treatment selected from a group consisting of high frequency induction hardening and ion nitriding, whereby the hardness of said portion is made larger than that of the compressor wheel-fitting shaft portion.

6. A method of producing a turbine rotor comprising a turbine vane wheel made of ceramics, a ceramic shaft formed integrally with the vane wheel and a metallic shaft bonded to the ceramic shaft, said method comprising subjecting a part of or the whole part of the metallic shaft located on a turbine vane wheel side from a compressor wheel fitting-shaft portion to a hardening treatment selected from a group consisting of high frequency induction hardening and ion nitriding, whereby the hardness of said part is made larger than that of the compressor wheel-fitting shaft portion, and then bonding the ceramic shaft to the metallic shaft.

7. A method of producing a turbine rotor according to claim 6, wherein only a bearing-contact portion of the metallic shaft is hardened.

8. A method of producing a turbine rotor according to claim 6, wherein the bonding between the metallic shaft and the ceramic shaft is made through interference fitting between a depression formed in the metallic shaft and a projection formed in the ceramic shaft.

9. A method of producing a turbine rotor according to claim 6, wherein the bonding between the metallic shaft and the ceramic shaft is made through fitting a projection formed in the ceramic shaft and having a diameter larger than the inner diameter of a depression formed in the metallic shaft by from 0.1% to 10% of the latter into the depression.

10. A method of producing a turbine rotor according to claim 9, wherein the fitting is carried out through press fitting at a temperature more than a use temperature to which the fitting portion is subjected during used.

11. A method of producing turbine rotor according to claim 6, wherein the bonding between the metallic shaft and the ceramic shaft is carried out through brazing.

* * * * *